United States Patent
Bailey et al.

(10) Patent No.: US 7,930,425 B2
(45) Date of Patent: Apr. 19, 2011

(54) METHOD OF EFFECTIVELY ESTABLISHING AND MAINTAINING COMMUNICATION LINKAGES WITH A NETWORK INTERFACE CONTROLLER

(75) Inventors: Warren D. Bailey, Pittsboro, NC (US); Michael H. Nolterieke, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 11/609,320

(22) Filed: Dec. 11, 2006

(65) Prior Publication Data
US 2008/0140819 A1  Jun. 12, 2008

(51) Int. Cl.
*G06F 15/173* (2006.01)
(52) U.S. Cl. ........................ 709/239; 709/224
(58) Field of Classification Search .......... 709/217–229, 709/238–244
See application file for complete search history.

(56) References Cited

U.S. PATENT DOCUMENTS

| 6,378,009 | B1 * | 4/2002 | Pinkston et al. | 710/62 |
| 6,487,608 | B2 * | 11/2002 | Gifford et al. | 710/8 |
| 7,003,563 | B2 * | 2/2006 | Leigh et al. | 709/223 |
| 2003/0065816 | A1 * | 4/2003 | Dharmadhikari et al. | 709/240 |
| 2003/0105904 | A1 | 6/2003 | Abbondanzio et al. | |
| 2004/0081104 | A1 | 4/2004 | Pan et al. | |
| 2005/0028000 | A1 | 2/2005 | Bulusu et al. | |
| 2005/0049976 | A1 | 3/2005 | Yang | |
| 2005/0076107 | A1 | 4/2005 | Goud et al. | |
| 2005/0182851 | A1 | 8/2005 | Buckler et al. | |
| 2007/0002826 | A1 * | 1/2007 | Bennett et al. | 370/351 |

* cited by examiner

*Primary Examiner* — Ian N Moore
*Assistant Examiner* — Afshawn Towfighi
(74) *Attorney, Agent, or Firm* — Edward J. Lenart; Cynthia G. Seal; Biggers & Ohanian, LLP

(57) ABSTRACT

Aspects of the present invention include a method, apparatus and device for establishing and maintaining communication with a network interface device and its link partner, such as a switch means or switch, where the network interface device identifies the type of link partner it is in communication with, determines the integrity of the link partner via a management module, and maintains a communication link in relation to the identified integrity status.

28 Claims, 6 Drawing Sheets

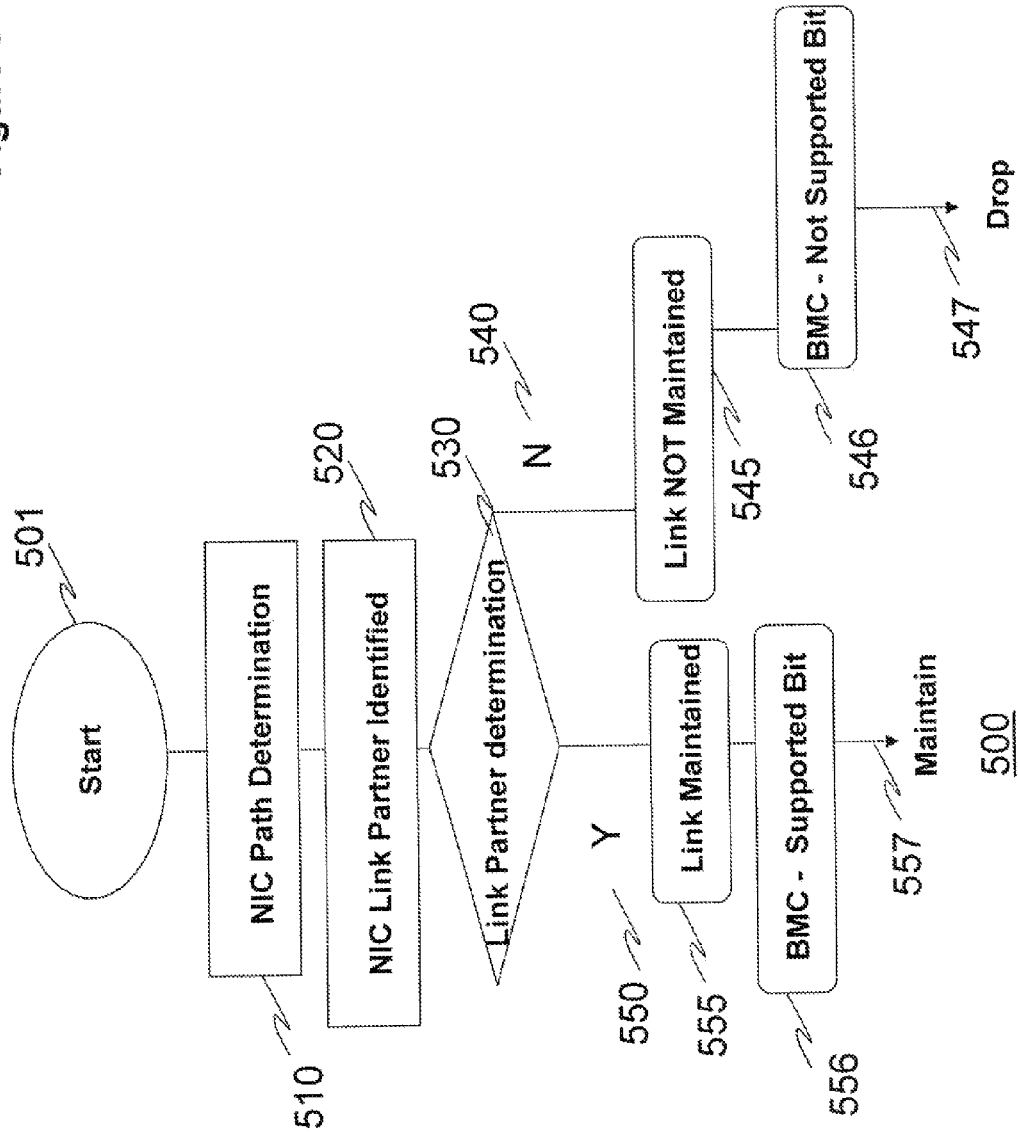

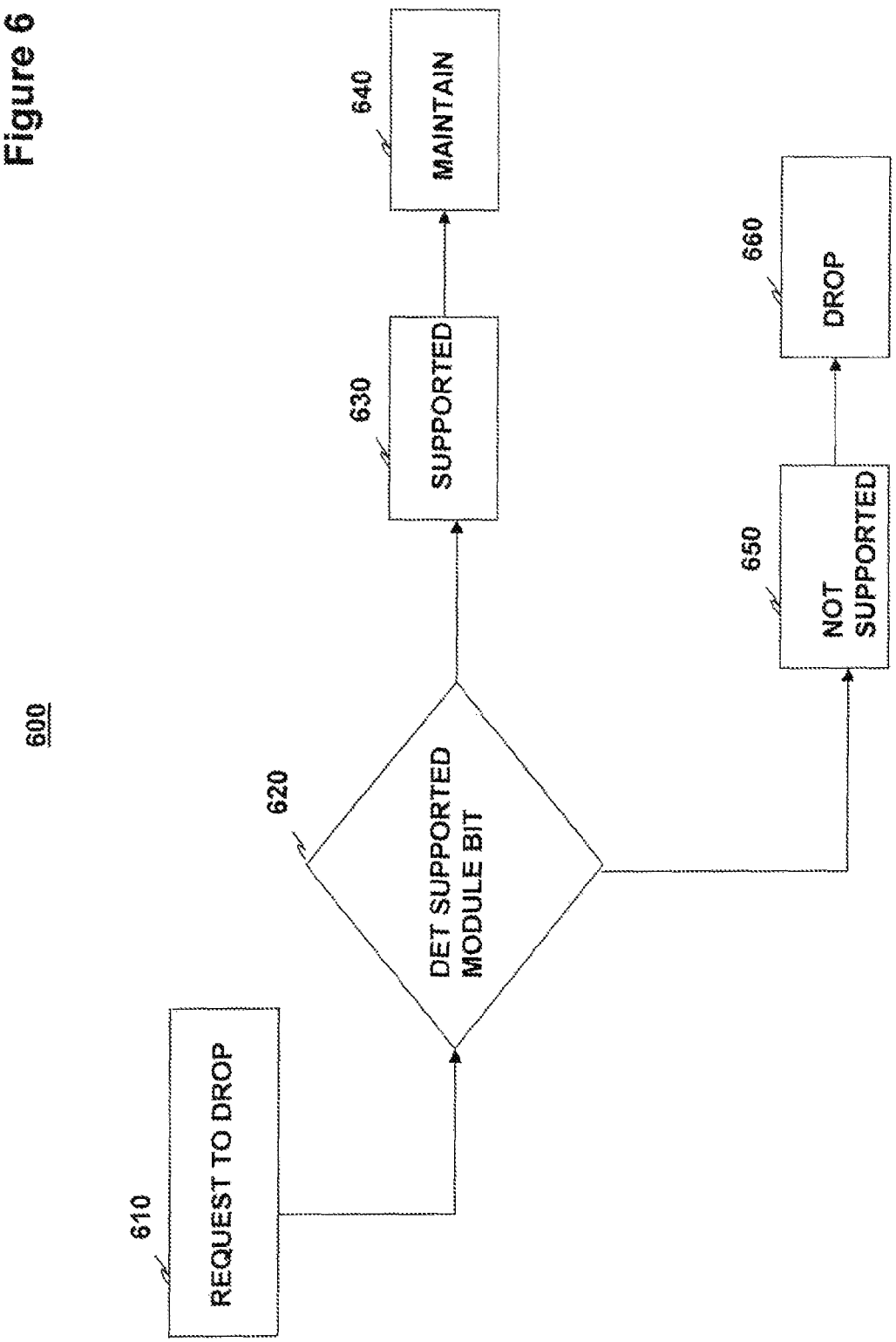

METHOD OF EFFECTIVELY ESTABLISHING AND MAINTAINING COMMUNICATION LINKAGES WITH A NETWORK INTERFACE CONTROLLER

CROSS REFERENCE TO RELATED APPLICATIONS

This application claims the benefit of U.S. application Ser. No. 10/006,976 filed Dec. 4, 2001, having U.S. Patent Publication Number 20030105904, published Jun. 5, 2003, entitled: "Monitoring Insertion/Removal of Server Blades in a Data Processing System," and also incorporates herein by reference.

FIELD OF INVENTION

The present invention generally relates to the field of communications in data processing systems and more particularly to a system and method for effectively establishing and maintaining communications in system having a Network Interface means such as a Network Interface Card (NIC).

BACKGROUND OF THE INVENTION

Although a Network Interface Controller or Network Interface Card (collectively, "NIC") is often understood to be a computer circuit board or card-type device that is often installed in a computer or similar system having a data processing means, it is also often believed to be a device that provides a full time connection to a network. Unfortunately, a NIC is a device that is capable of providing a full time connection, but in many circumstances, that capability is not satisfied as it often drops its connection with its linked partner device upon the occurrence of various events such as, but not limited to: rebooting, Preboot Execution Boot (PXE) ROM loading, network device driver loading, and the like. Though the communication connection drop occurring during these events has often logically been acceptable in the computing environment as a means to assure the reliability, state or integrity of a link partner, these events often now result in reset situations where significant time is lost, improved conveniences are foregone, and communication gaps create functional inoperability within the environment. Therefore, while there may exist conveniences with various improvements in the computing environments, such as PXE environments where the computer becomes bootable off of the network, this additional capability and performance is often sacrificed as a communication link fails between the NIC and the link partner.

A routine example of this lost effort is known to occur in a blade system or a server blade environment, wherein the terms are used interchangeably herein. A blade system is a data processing system that has a server chassis or cabinet and a plurality of racks. Often, each cabinet rack can hold a rack mounted device (also referred to herein as a blade or server blade) on which one or more general purpose processors and/or memory devices are attached. A blade or blade server is mounted in a rack as an input/output (I/O) device, wherein other devices capable of being mounted for I/O capabilities is also understood. The racks are typically vertically spaced within the cabinet according to an industry standard displacement (the "U"). Cabinets and racks are characterized in terms of this dimension such that, for example, a 42U cabinet is capable of receiving 42 1U rack-mounted devices, 21 2U devices, and so forth. Dense server designs are also becoming available, which allow a server chassis to be inserted into a cabinet rack, thus allowing greater densities than one server per 1U. To achieve these greater densities, the server chassis may provide shared components, such as power supplies, fans, or media access devices which can be shared among all of the blades in the server blade chassis.

In a server blade environment, Serial Over Local Area Network (SOL) is a function providing access by a blade to serial consoles. The SOL feature lets servers transparently redirect the serial character stream from the baseboard universal asynchronous receiver/transmitter (UART) to and from a remote client system over the Local Area Network (LAN). The UART generally translates data between parallel and serial interfaces, and is often used for serial data telecommunication as it converts bytes of data to and from asynchronous start-stop bit streams represented as binary electrical impulses.

In general, SOL has the following benefits compared to a serial interface: 1) eliminates the need for a serial concentrator, 2) reduces the amount of cabling, and 3) allows remote management of servers without video, mouse, or keyboard (headless servers). Many of the blade server components work together to implement SOL, including the chassis Management Module ("Management Module"), Baseboard Management Controller (BMC), and Ethernet Switch Module, as well as the blade servers' BIOS, Advanced System Management Processor, and ethernet interface firmware, for example.. Additionally, the SOL typically enables the LAN connection to be shared as between the operating system (OS) and BMC.

In some instances, however, an established SOL session may drop for a period in excess of a few seconds and even require a number of minutes. Such an extended connectivity time causes a SOL session to go to the "Active" and "Not Ready" states in operation. Typically, an operator is required to thereafter wait an additional period of time (i.e., five minutes) for the Management Module to time-out the current inactive session so it may thereafter be restarted, after waiting for the SOL session on a failing blade to go into the "Enabled" state.

A Management Module (MM) is typically a hot-swappable hardware device plugged into a blade environment chassis management bay and functions as a system-management processor (e.g., service processor) and keyboard, video, and mouse (KVM) multiplexor for blade servers. The management module is typically connected to the cluster management Virtual Local Area Networks (VLANs) for security enhancement.

A BMC is typically a specialized microcontroller embedded on the motherboard of many computers, and often, servers. The BMC is the intelligence function in the Intelligent Platform Management Interface (IPMI) architecture, and it manages the interface between system management software and platform hardware. Different types of sensors built into the computer system report to the BMC on parameters such as temperature, cooling fan speeds, power mode, operating system (OS) status, etc. The BMC function is capable of monitoring the sensors and can send alerts to a system administrator or user via the network if any of the parameters do not stay within preset limits, indicating a potential failure of the system. In operation, the administrator can also remotely communicate with the BMC to take some corrective action such as resetting or power cycling the system to get a hung OS running again. Typically, the BMC communicates with a BMC management utility (BMU) on a remote client using IPMI protocols.

However, even after first dropping an established SOL session and then restarting the session based on understanding simplistic link protocols of the link partner, normal SOL communication is but only a possibility and not guaranteed.

In another scenario, if the SOL session drop occurs during the loading of the operating system and a user is desirous to change configuration information during such time at which the SOL is "Not Ready", an additional extend period of time results as the user waits until the operating system is completely loaded. It is Only after an operating system completes its loading that a user may thereafter restart the operating system. Only during this second operating system loading would a user then be able to obtain access to the serial interface and to the system resources.

Scripted solutions have also been an effort attempted by some to overcome delays resulting in dropped sessions. However, even where customized scripts have been attempted by transmitting redundant packets along a communication link numerous times to extend disruption or retry intervals, these attempts have not been successful given new technologies mandating low disruption times and additional features as is set forth herein Additionally, and again unfortunately, these extended delays are now met with operability delays and failure as concurrent features such as KVM, virtual media tray, etc. are less tolerant of link disruption times when compared to that of SOL for example, where such concurrent features often require maximum disruption time of no more than 50 milliseconds (ms) and some no more than 5 ms. For instance, the IBM® BladeCenter provides built-in KVM access to each blade server in the chassis allowing operators to remotely access system BIOS information and graphical user interfaces (GUIs). Unlike serial console access, the KVM interface provides a GUI that requires a human operator to use and interpret all data. Since the KVM is generally used to provide occasional access to systems for maintenance and emergency recovery, timing is essential. As can be appreciated reliable, economical and efficient techniques for establishing and maintaining communication with NICs and their link partners, where the NIC has knowledge of its environment including its link partner and wiring characteristics, are highly desirable.

Accordingly, what is needed is a method and system for establishing and maintaining communication with NICs and their link partners, where the NIC has knowledge of its environment including its link partner(s).

SUMMARY OF THE INVENTION

The present invention fulfills these needs and has been developed in response to the present state of the art, and in particular, in response to the problems and needs in the art that have not yet been fully solved by currently available security protocols and technologies.

A method for establishing and maintaining communication with a NIC and its link partner, such as a switch means or switch, where the NIC identifies the type of link partner it is communication with, determines the integrity of the link partner, and maintains a communication link in relation to the identified integrity status, is disclosed.

A method for communication with a network interface means and an associated link partner of a data processing system by: identifying a type of link partner said network interface means is in communication with, determining an integrity value for said link partner, updating a link partner data bit in a memory means of said network interface means in relation to data characteristics of said link partner; and affecting said communications of said network interface means with said link partner in relation to said updated link partner data bit, is disclosed.

A data processing system having a network interface means having a method for establishing and maintaining communication with its link partner, where the network interface means identifies the type of link partner it is communication with, determines the integrity of the link partner, and maintains a communication link in relation to the identified integrity status, is also disclosed. In a preferred embodiment, the data processing system further determines characteristics of the link partner beyond basic link protocols of the link partner.

A blade server data processing system having a plurality of blades, a management module (MM), a baseboard management controller (BMC), Non-Volatile Random Access Memory (NVRAM), and one or more network interface cards (NICs) each being capable of establishing and maintaining communication with its respective link partner by the management module identifying the type of link partner it is communication with, determining the integrity of the link partner, and maintaining a communication link in relation to the identified integrity status, where the NICs and one or modules of the blade server are preset to instantiate in a common mode thereby avoiding a need for resetting the link partner, is also disclosed.

A computer program product stored on a computer usable medium comprising one or more computer readable program means for causing a computer to control an execution of an application; the computer program product including program instructions for: identifying the type of link partner a network interface means is in communication with, determining the integrity of the link partner, and maintaining a communication link between the network interface means and the link partner in relation to the identified integrity status, is also disclosed.

BRIEF DESCRIPTION OF THE DRAWING(S)

Figure 4:
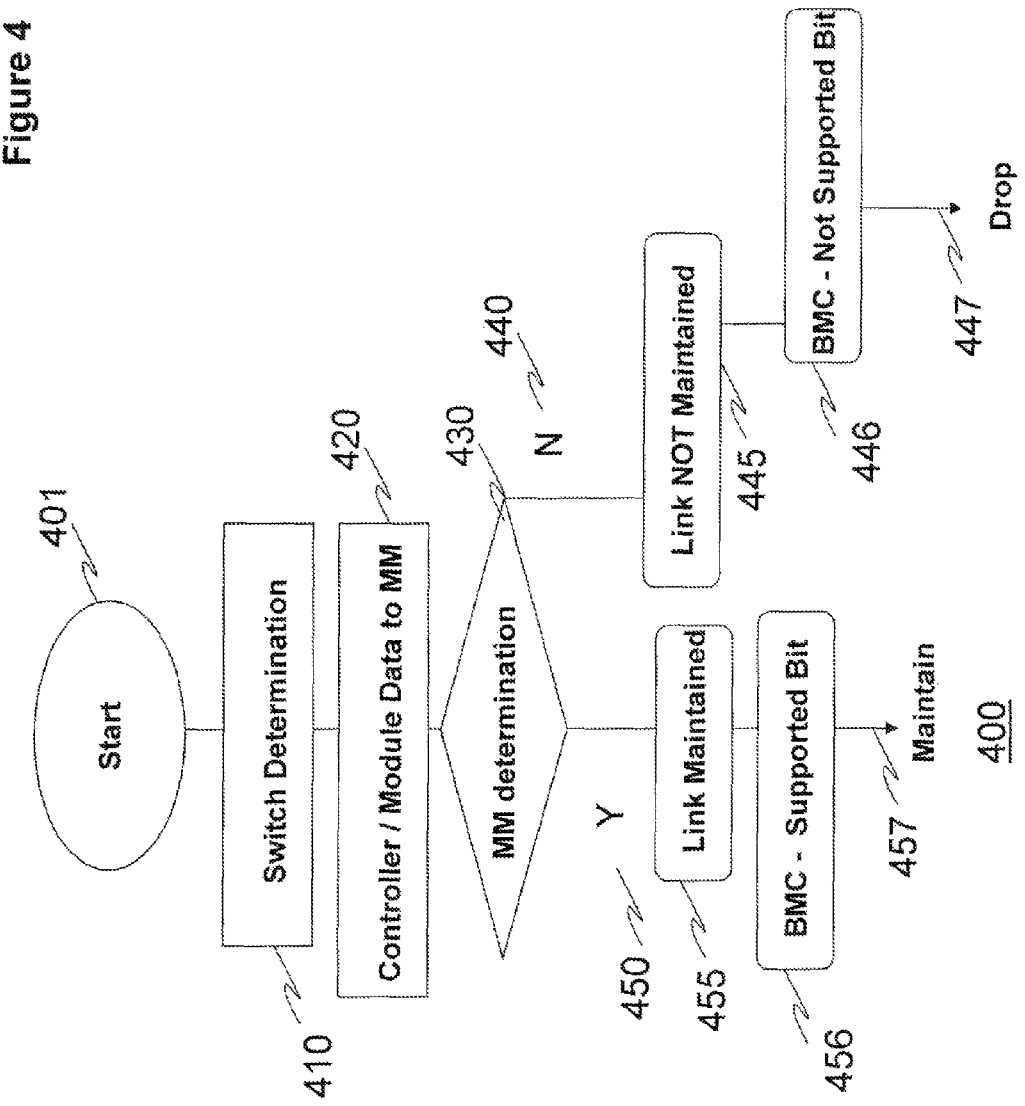

FIG. 4 illustrates one embodiment of the present invention as a method for establishing and maintaining communication between a network interface means and its link partner, such as a switch, where the network interface identifies the type of link partner it is communication with, determines the integrity of the link partner, and maintains a communication link in relation to the identified integrity status.

FIG. 5 illustrates one embodiment of the present invention in a non-blade environment.

FIG. 6 sets forth an operational logic for one embodiment of the present invention.

DETAILED DESCRIPTION OF THE ILLUSTRATIVE EMBODIMENTS

The present invention generally relates to the field of communications in data processing systems and more particularly to a system and method for effectively establishing and maintaining communications in system having a Network interface means such as a Network Interface Card (NIC). The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
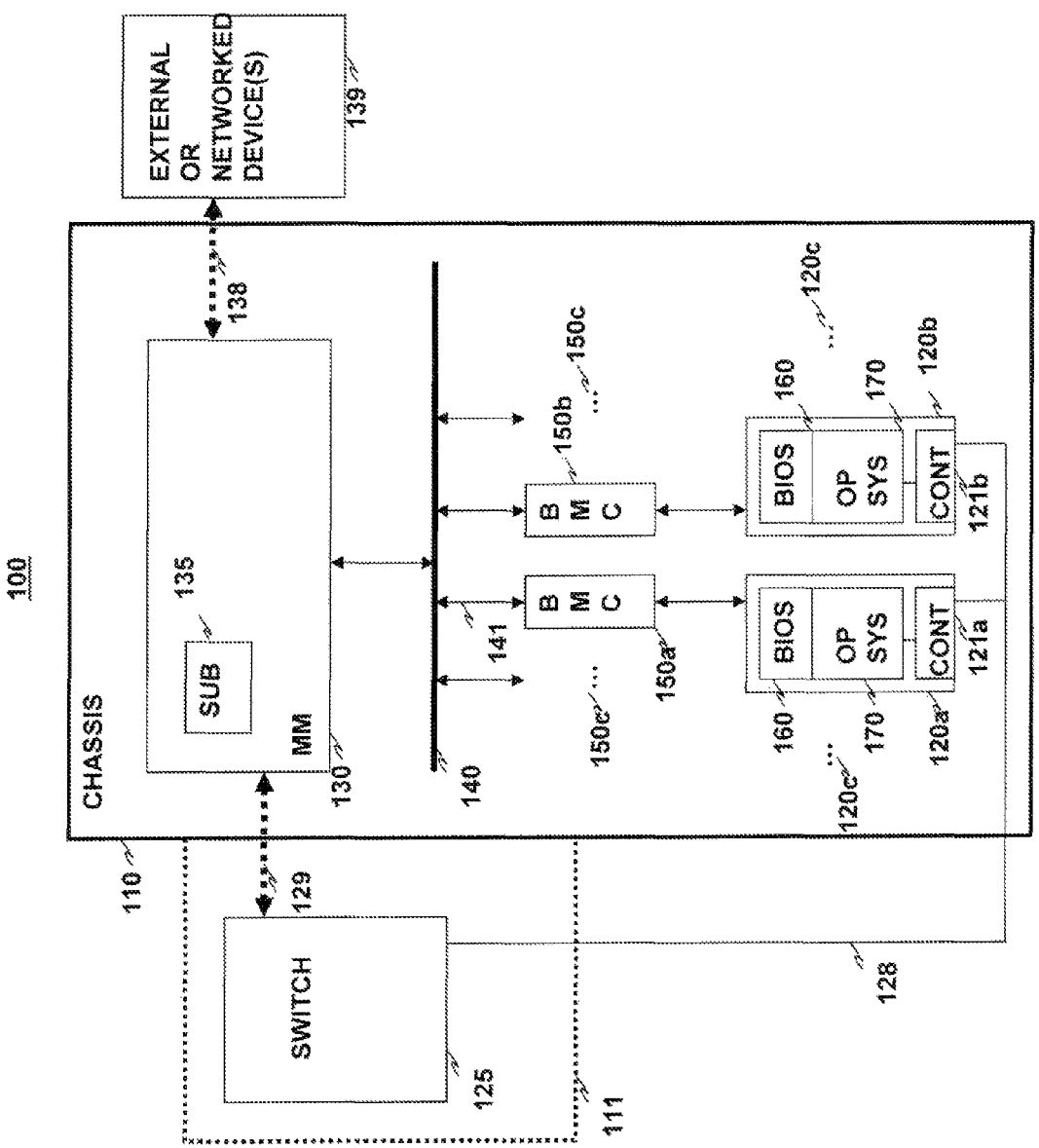
FIG. 1 is a block schematic representation of an exemplary Blade Server.

FIG. 1 is a block schematic representation of an exemplary Blade Server system 100 capable of the present invention. The system 100 includes a chassis 110 (also known as a "rack" or "cage"). The chassis 110 typically house one or more blades 120a, 120b, and as indicated by 120c. A blade may be hardware, software or a combination thereof, may contain memory, processor(s), and connectivity therewith, and may further include devices having one or more processors acting independently, in combination or as a server or processor.

The chassis also houses a MM 130, such as that previously discussed above, wherein the MM provide a logical management means, may have logical subfunctionality 135, is typically operative across a backplane or processor thereon and is capable of communication with the blades 120a, 120b and 120c through a bi-direction communication means such as a data bus, circuit or other communication pathway 140 and provides authorization for communications across 138 between blades 120a, 120b, 120c and other devices including external or networked devices 139, such as printers and servers.

A Network Interface means, such as a NIC, at 125 is capable of communication at 129 with the MM 130 and may or may not be present within the chassis 110 at shown by 111. The NIC 125 is in communication via 128 with one or more controllers 121a, 121b which are communicatively linked to their respective BMC 150a, 150b, via a system management processor or communication channel such as that of a communication channel having an intelligent platform management interface (IPMI) channel at 141, for example. IPMI refers to the autonomous monitoring and recovery features implemented directly in platform management hardware and firmware so that monitoring, logging, recovery, and inventory information is available independent of the host's main processors, BIOS, and operating system (OS).

As described above, a BMC 150a, 150b is associated with each blade, 120a, 120b, respectively, and enables communication between its respective blade and the MM 130, wherein such communication with the blade may involve the controller 121a, 121b. Additional BMCs may exist at 150c with respect to the presence of blades 120c. Additionally, it is known that a blade typically may include software capability or features such as basic input/output system ("BIOS") logic 160 (which may exist as software, firmware, hardware logic, or a combination thereof) and operating system software 170.

In operation, the NIC is able to determine the type of switch it is connected to along 128 and determine the integrity or data characteristics and hence validity of the link status of the switch means 125. The MM 130 is able to determine the type of module (i.e., blade device) installed and whether the module is able to support SOL as well as other predetermined concurrent features or characteristics and as may otherwise be determined by a user hereafter. The concurrent features may include but not necessarily be limited to KVM, virtual media tray, etc. which are less tolerant of link disruption times when compared to that of SOL. The BMC 150a, 150b is then notified by the MM 130 of the features or characteristics of the modules, including those associated with concurrent features, and the BMC is able to configure the NIC in accordance with the determined features of characteristics, such that the link connection between the NIC and the switch is maintained or dropped.

In a preferred embodiment, the controller 121a, 121b is an ethernet controller and the operating system is a device driver such as that for a specific or preferred operating system of the user. Additionally, preferably, the blade is a combination of software, hardware and firmware which includes BIOS, an operating system, and a controller device (i.e., "on board") acting in an integrated manner.

In another preferred embodiment of the present invention, the KVM concurrent feature is a keyboard capable of simultaneously or concurrently serving a plurality of blades in a blade server environment, wherein link disruptions times are required to be less than 50 milliseconds and in many cases, less than 5 milliseconds, or an active session may drop.

Figure 2:
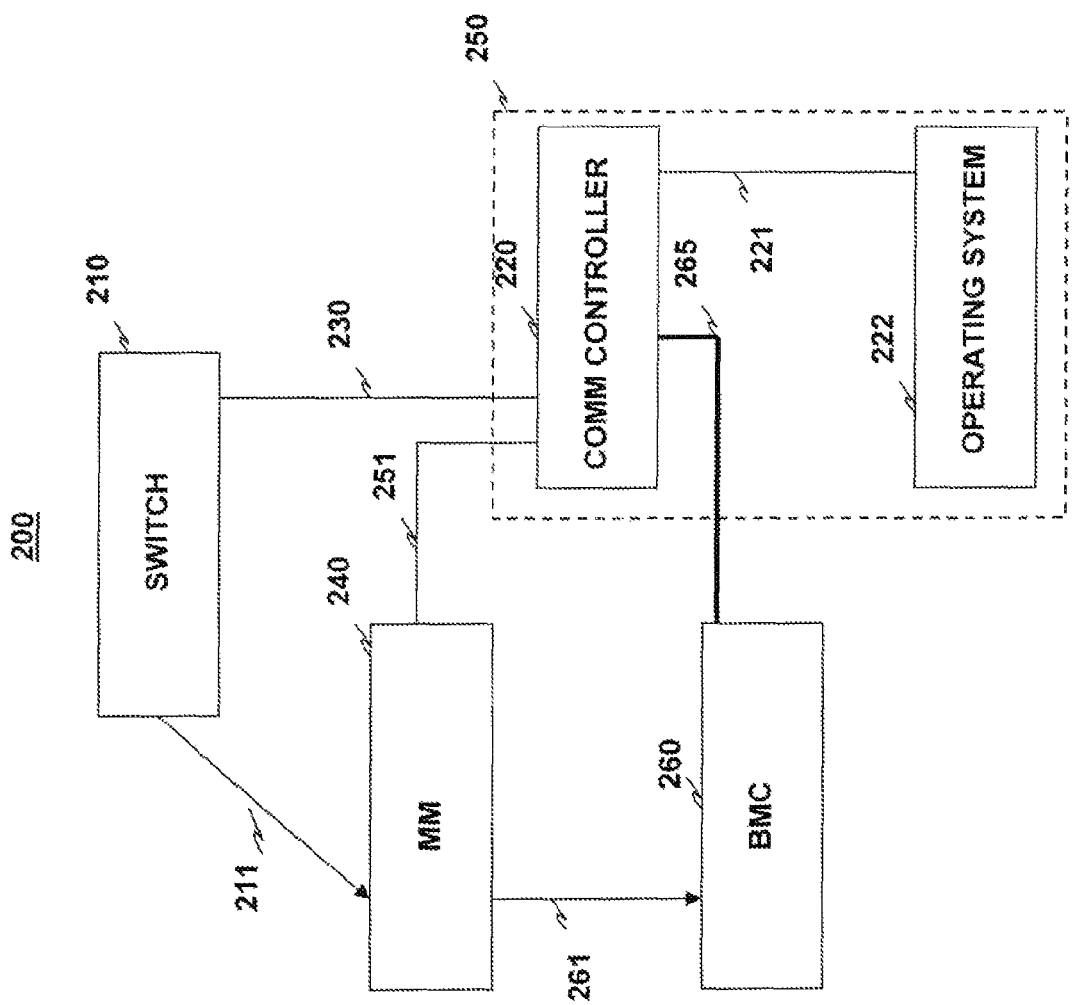
FIG. 2 is a functional block schematic representation of communication linkages of the present invention.

FIG. 2 is a functional block schematic representation of communication linkages 200 of the present invention. In FIG. 2, a switch means 210 is a link partner of a controller means 220 via a communication pathway 230. An objective of the present invention is to seek to maintain the communication link along the communication pathway 230 where the switch means 210 is a link partner that has integrity, where integrity is determined in relation to the characteristics of the switch means.

The controller means 220 (and hence blade 250) is able to obtain the link state and capabilities of switch means 210 it is connected to along 230, employing an auto-negotiation means such as that but not limited to select standards of the IEEE wherein, by exemplar, the switch means could negotiate speed or mode with an attached device 250. Similarly, the switch means 210 is able to obtain the link state and capabilities of the blade 250 it is connected to along 230. The MM 240 receives information concerning the link state from one or both of the switch means 210 and the blade 250. Additionally, the MM 240 is able to determine further data characteristics of the controller means, at 251 and of the switch means at 211. As used herein, the terms "data characteristics" include but are not limited to protocol information, operating characteristics, concurrent features and link duration requirements, for example, of the identified subjects.

The MM 240 is able to determine the type of module (i.e., blade device) 250 installed based upon data characteristics received via 251 concerning the controller means 220 (which is in communication along 221 with an operating system 222) and is thereafter able to determine whether the module is able to support SOL as well as other predetermined concurrent features or characteristics and as may be otherwise determined by a user hereafter. The MM 240 then has knowledge of the data characteristics in addition to link state information of the switch means 210, controller 220 and blade 250. The MM 240 then is able to determine whether to reset the link or not and thereafter notifies the BMC 260 of the data characteristics of the modules, including those associated with concurrent features, along 261.

The BMC 260 is preferably hardware that then configures the controller means 230 and writes to an NVRAM location accessible by firmware of the controller means so the controller means is aware of what is installed, in accordance with the determined data characteristics along 265. The BMC's configuration of the controller means, for instance at a set speed or link duration, permits the link connection between the controller means and the switch means to be maintained or dropped.

Figure 3:
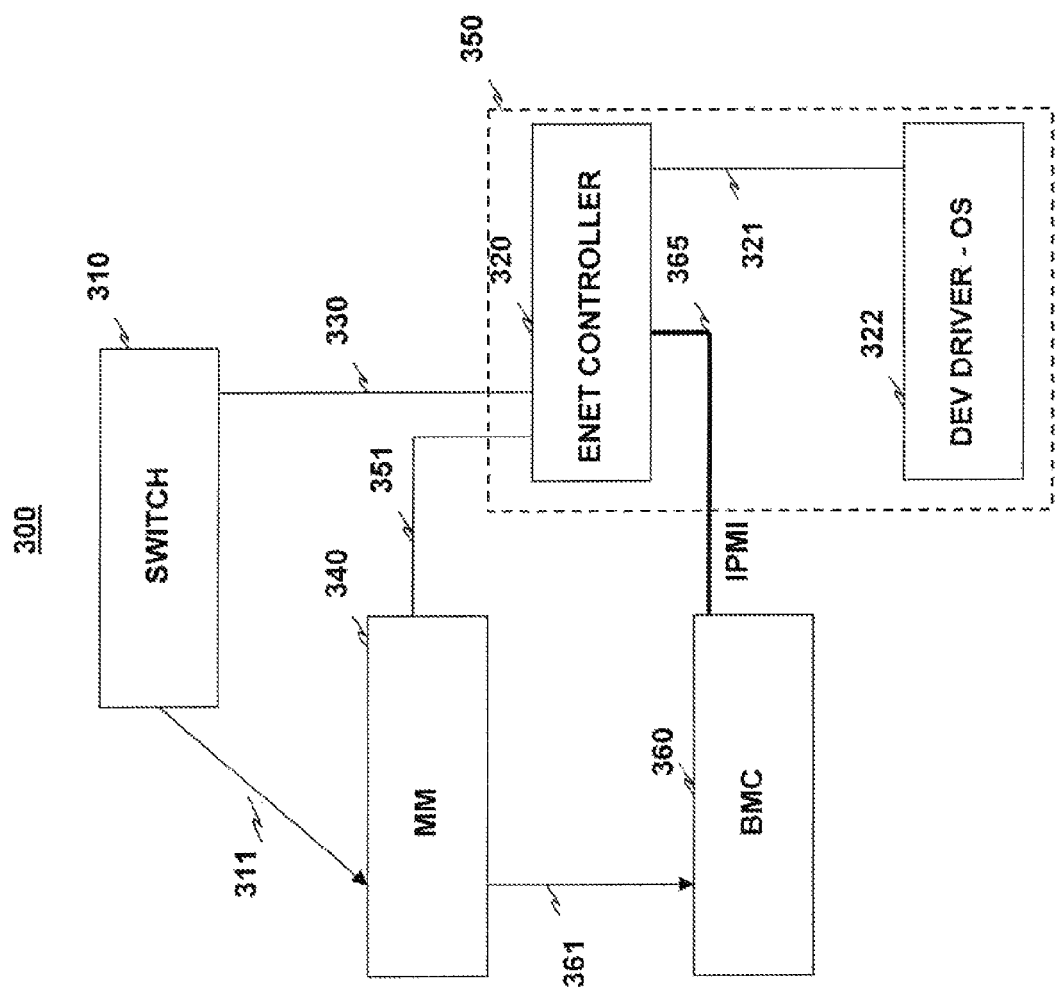
FIG. 3 is a functional block schematic representation of communication linkages of the present invention in a preferred embodiment.

FIG. 3 is a functional block schematic representation of communication linkages 300 of the present invention in a preferred embodiment. In FIG. 3, a switch 310 is a link partner of an ethernet controller 320 via a communication pathway 330. The ethernet controller 320 is able to obtain the link status and capabilities of switch 310 it is connected to along 330 and is able to gather data characteristic of the switch and inform the MM 340 of the data characteristics of the ethernet controller, at 311. Similarly, the switch 310 is able to gather link status and capabilities of the ethernet controller 320 and inform the MM 340 of the data characteristics of the controller means, at 351. The MM 340 receives information concerning the link state from one or both of the switch 310 and effectively the attached device or blade of 350. The MM 340 is able to determine the type of module (i.e., blade device) 350 installed based upon data characteristics received via 351 concerning the controller means 320 (which is in communication along 321 with a data driver of an operating system 322) and is thereafter able to determine whether the module is able to support SOL as well as other predetermined concurrent features or characteristics and as may be otherwise determined by a user hereafter. The MM 340 then has knowledge of the data characteristics in addition to link state information of the switch 310, ethernet controller 320 and blade 350. The MM 340 is able to determine whether to reset the link or not and thereafter notifies the BMC 360 of the data characteristics of the modules, including those associated with concurrent features, along 361. The BMC 360 configures the ethernet controller 330 and writes to an NVRAM location accessible by firmware of the ethernet controller so the ethernet controller is aware of what is installed, in accordance with the determined data characteristics along an IPMI channel at 365. The BMC's configuration of the controller means, for instance at a set speed or link duration, permits the link connection between the ethernet controller and the switch to be maintained or dropped.

In a further preferred embodiment, the controller means is a NIC.

FIG. 4 illustrates one embodiment of the present invention as a method 400 for establishing and maintaining communication between a network interface means and its link partner, such as a switch, where the network interface identifies the type of link partner it is communication with, determines the integrity of the link partner, and maintains a communication link in relation to the identified integrity status.

From FIG. 4, the process starts at 401 by the network interface determining the type of switch it is connected to at 410. The network interface and associated module data characteristics and link state, i.e., information or data characteristics, is provided to the MM at 420. At step 430, the MM then determines if the module (i.e., blade device) installed is able to support SOL as well as other predetermined concurrent features or data characteristics and as may otherwise be determined by a user hereafter.

If the resulting determination is that the link partner (switch, module, blade, etc.) is not able to support the desired features or does not have the desired data characteristics at 440, the link between the network interface and the link partner will not be maintained and will be dropped at 447. In order to enable the link to be dropped, the MM sends a command to the BMC at 446 to set or change a bit in the NVRAM used by the firmware of the network interface indicating that a supported module is not installed and is not in communication with the network. The network interface, when thereafter requested to drop and renegotiate the communication link, will first assess the NVRAM bit (i.e., supported module bit). When the network interface reads the supported module bit, it will accept the request to drop the link and the connection is dropped at 447 as the supported module bit indicates a non-supported module.

If the resulting determination is that the link partner (switch, module, blade, etc.) is able to support the desired features or does have the desired data characteristics at 450, the link between the network interface and the link partner will be maintained and will not be dropped at 455. In order to enable the link to not be dropped, the MM sends a command to the BMC at 456 to set or change a bit in the NVRAM used by the firmware of the network interface indicating that a supported module is installed and is in communication with the network. The network interface, when thereafter requested to drop and renegotiate the communication link, will first assess the NVRAM bit (i.e., supported module bit). When the network interface reads the supported module bit, it will ignore the request to drop the link and the connection is simply maintained at 457.

Many other embodiments of the present invention are also envisioned. For example, in other embodiments, the present invention is directly applicable for integrated circuits, subsystem components and circuitry, power related devices, software process and programmable chip technology.

Alternatively, is it also envisioned that the present invention may also be used in a non-blade environment.

FIG. 5 illustrates one embodiment of the present invention in a non-blade environment. The method of FIG. 5, 500, is for establishing and maintaining communication between a network interface means and its link partner, where a network management means determines the physical communication pathway to the NIC at 510, the NIC identifies the type of link partner it is communication with to the network management means at 520, the network management means determines the integrity of the link partner at 530, and drops a communication link at 540 or maintains a communication link at 550, in relation to the identified integrity status by having a BMC update a supported module bit of the NVRAM in accordance with the integrity status.

If the resulting determination is that the link partner (switch, module, blade, etc.) is not able to support the desired features or does not have the desired data characteristics at 540, the link between the network interface and the link partner will not be maintained and will be dropped at 547. In order to enable the link to be dropped, the network management means sends a command to the BMC via SOL at 546 to set or change a bit in the NVRAM used by the firmware of the network interface indicating that a supported module is not installed and is not in communication with the network. The network interface, when thereafter requested to drop and renegotiate the communication link, will first assess the NVRAM bit (i.e., supported module bit). When the network interface reads the supported module bit, it will accept the request to drop the link and the connection is dropped at 547 as the supported module bit indicates a non-supported module.

If the resulting determination is that the link partner (switch, module, blade, etc.) is able to support the desired features or does have the desired data characteristics at 550, the link between the network interface and the link partner will be maintained and will not be dropped at 555. In order to enable the link to not be dropped, the network management means sends a command to the BMC via SOL notifying it to set or change a bit in the NVRAM at 556 used by the firmware of the network interface indicating that a supported module is installed and is in communication with the network. The network interface, when thereafter requested to drop and renegotiate the communication link, will first assess the NVRAM bit (i.e., supported module bit). When the network interface reads the supported module bit, it will ignore the request to drop the link and the connection is simply maintained at 557.

By way of example, the network management means of the present embodiment may be a network management utility such as IBM Director.

FIG. 6 sets forth an operational logic for one embodiment of the present invention.

From FIG. 6, the NIC 610 may receive a request to drop a communication link upon the occurrence of one of many events, such as rebooting, PXE ROM loading, loading network device drivers, etc. Prior to dropping the communication link with its link partner, the NIC will assess the supported module bit of the NVRAM of the NIC firmware at 620. Upon assessing the supported module bit, the NIC is able to determine whether to maintain or drop the communication link, based upon the supported module bit set/change status or value. If the supported module bit indicates that the module is a supported bit, at 630, wherein the supported module bit has been determined based upon the data characteristics of the module through a BMC order and a network management means, the communication link will be maintained at 640 and the request to drop will be ignored. If the supported module bit indicates that the module is not a supported bit, at 650, wherein the lack of a supported module bit has been determined based upon the data characteristics of the module through a BMC order and a network management means, the communication link will not be maintained at 660 and the request to drop will be accepted.

As used herein for the purposes of the present invention, the term "Non-Volatile Random Access Memory (NVRAM)" is the general name used to describe any form of high-speed computer memory or computer memory means which does not lose its information when power is turned off. As used herein, the terms "data characteristics," "partner data," "linked data" and "type" include but are not limited to information regarding link state, status, and capabilities thereof.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method for communication with a network interface means and an associated link partner of a data processing system by:

identifying a type of link partner said network interface means is in communication with, determining an integrity value for said link partner, updating, by a baseboard management controller, a link partner data bit in a memory means of said network interface means in relation to data characteristics of said link partner;

and affecting said communications of said network interface means with said link partner in relation to said updated link partner data bit; wherein where said integrity value supports a concurrent feature so as to maintain said network interface means communication with said link partner if said link partner has one or more concurrent features or data characteristics, both of which require a link disruption of less than 50 milliseconds.

2. The method of claim 1, further including a network management means of said data processing system conducting said step of determining said integrity value and said baseboard management controller conducting said step of updating a link partner bit in relation to said determining step.

3. The method of claim 2, wherein said updating step further comprises said network management means communicating a supported command notification to said baseboard management controller which thereby updates said link partner data bit to a supported status so as to maintain said communication between said network interface means and said link partner.

4. The method of claim 2, wherein said updating step further comprises said network management means communicating a non-supported command notification to said baseboard management controller which thereby updates said link partner data bit to a non-supported status so as to drop said communication between said network interface means and said link partner.

5. The method of claim 2, wherein said updating step further comprises said network management means communicating a bit command notification to said baseboard management controller which thereby updates said link partner data bit in relation to said integrity value so as to affect said communication between said network interface means and said link partner as one of maintaining or dropping said communication, wherein said system is a blade server environment and said network management means is a management module.

6. The method of claim 5, wherein
said network interface means is a Network Interface Card (NIC), and said memory means is Non-Volatile Random Access Memory (NVRAM) of the NIC and said step of identifying said type identifies a link state of link partner.

7. The method of claim 6, wherein said concurrent features include one or more of Keyboard Video Mouse (KVM), virtual media tray, or any of which require link disruption times lesser than those disruption times permitted under Serial over Local Area Network (SOL) features.

8. The method of claim 7, wherein said link partner is one of a blade, a switch, a peripheral device or other device in or capable of communication with said system.

9. The method of claim 8, wherein said system contains at least a plurality of blades.

10. The method of claim 2, wherein said updating step further comprises said network management means communicating a bit command notification to said baseboard management controller which thereby updates said link partner data bit in relation to said integrity value so as to affect said communication between said network interface means and said link partner as one of maintaining or dropping said communication, wherein said network management means is a network management utility.

11. A method for communication with a network interface device and an associated switch means of a blade server system having at least four blade servers, by:
identifying said switch means as to data characteristics of said switch means which is in communication with said network interface device, determining support by a management module means of at least one of said blades in relation to one or more concurrent features or data characteristics, both of which require requiring a link disruption of less than 50 milliseconds,
updating, by a baseboard management controller, a support data bit by a baseboard management controller means in a memory means of said network interface device in relation to data characteristics of said at least one of said blades,
affecting said communications of said network interface device with said switch means in relation to said updated support data bit by one of either discontinuing or maintaining said network interface device communication with said at least one of said blades, and
maintaining said communication between said network interface device and said at least one of said blades if one of said blades has one or more concurrent features or data characteristics, both of which require a link disruption of less than 50 milliseconds.

12. The method claim 11, wherein said network interface device includes a plurality of network interface devices.

13. The method of claim 12, wherein said network interface device is a NIC, said switch means is a switch, and said data characteristics include a link state of said switch.

14. An apparatus comprising: a blade server environment having one or more blades,
a switch means in communication with said one or more blades,
a chassis wherein said one or more blades are housed thereon,
a management module having a logical management means,
one or more bi-direction communication means between said one or more blades and one or more other devices networked thereto,
a network interface means capable of communication with said management module,
a baseboard management controller means capable of communication with said management module and capable of communication with said network interface means,
one or more main processors,
basic input/output system (BIOS) logic,
and an operating system,
wherein said blade server environment further comprising the steps of said network interface means and said switch means communicating by:
identifying said switch means data characteristics,
determining support by said management module of at least one of said blades in relation to one or more concurrent features or data characteristics requiring a link disruption of less than 50 milliseconds,
updating a support data bit by said baseboard management controller means in a memory means of said network interface means in relation to data characteristics of said at least one of said blades,
affecting said communications of said network interface means with said switch means in relation to said updated support data bit by one of either discontinuing or maintaining said network interface means communication with said at least one of said blades,
and
maintaining said communication between said network interface means and said at least one of said blades if one of said blades has one or more concurrent features or data characteristics, both of which require a link disruption of less than 50 milliseconds.

15. The apparatus of claim 14, wherein said network interface means is a NIC, said switch means is a switch, and said data characteristics include a link state of said switch.

16. The apparatus of claim 15, wherein and said memory means is Non-Volatile Random Access Memory (NVRAM) of the NIC, said concurrent features include one or more of Keyboard Video Mouse (KVM), virtual media tray, or any of which require link disruption times lesser than those disruption times permitted under Serial over Local Area Network (SOL) features.

17. An apparatus comprising: a blade server environment having one or more blades,
a link partner in communication with said one or more blades,
a chassis wherein said one or more blades are housed thereon,
a management module having a logical management means,
one or more bi-direction communication means between said one or more blades and one or more other devices networked thereto, including said link partner a network interface device capable of communication with said management module,
a baseboard management controller means capable of communication with said management module and capable of communication with said network interface device,
one or more main processors,
basic input/output system (BIOS) logic,
and an operating system,
wherein said blade server environment: further comprising the steps of said network interface device and said link partner future communications continuing by:
identifying said link partner data characteristics,
determining support by said management module of at least one of said blades in relation to one or more concurrent features or data characteristics requiring a link disruption of less than 50 milliseconds,
updating a support data bit by said baseboard management controller means in a memory means of said network interface device in relation to data characteristics of said at least one of said blades,
affecting said communications of said network interface device with said link partner in relation to said updated support data bit by one of either discontinuing or maintaining said network interface device communication with said at least one of said blades,
and
maintaining said communication between said network interface device and said at least one of said blades if one of said blades has one or more concurrent features or data characteristics, both of which require a link disruption of less than 50 milliseconds.

18. The apparatus of claim 17, wherein said memory means is Non-Volatile Random Access Memory (NVRAM) of the network interface device.

19. A computing device comprising: a plurality of blade servers, a link partner in communication with said plurality of blade servers, a chassis wherein said one or more blades are housing said plurality of blade servers, a management module having a logical management means, one or more bi-direction communication means, a network interface device in communication with said management module, a baseboard management controller in communication with said management module and capable of communication with said network interface device, and one or more main processors, wherein said device further comprising logic means for:
  identifying said link partner data characteristics,
  determining support by said management module of at least one of said plurality of blade servers in relation to one or more concurrent features or data characteristics requiring a link disruption of less than 50 milliseconds,
  updating a support data bit by said baseboard management controller in a non-volatile random access memory (NVRAM) of said network interface device in relation to data characteristics of at least one of said plurality of blade servers,
  affecting said communications of said network interface device with said link partner in relation to said updated support data bit by one of either discontinuing or maintaining said network interface device communication with at least one of said plurality of blade servers, and
  maintaining said communication between said network interface device and one or more of said plurality of blade servers if one of said plurality of blade servers has one or more concurrent features or data characteristics, both of which require a link disruption of less than 50 milliseconds.

20. A computing device comprising: a plurality input/output bays (I/O bays), a link partner in communication with said plurality of I/O bays, a chassis wherein one or more I/O devices are housed, a management module having a logical management means, one or more bi-direction communication means, a network interface device in communication with said management module, a baseboard management controller in communication with said management module and capable of communication with said network interface device, and one or more main processors,
  wherein said device further comprising logic means for:
  identifying said link partner data characteristics, determining a support position of at least one I/O device housed in at least one I/O bay using said management module in relation to one or more concurrent features or data characteristics requiring a predetermined minimal link disruption time,
  updating a support data bit by said baseboard management controller in a non-volatile random access memory (NVRAM) of said network interface device in relation to data characteristics,
  reading said support data bit in NVRAM by said network interface device,
  and acting to maintain said network interface device communication with any of said I/O devices in any of said I/O bays if one of said I/O devices has one or more concurrent features or data characteristics, both of which require a link disruption of less than 50 milliseconds.

21. The device of claim 20, wherein where said support bit is characteristic of one or more concurrent features, said step of acting includes maintaining said communication.

22. The device of claim 20, wherein where said support bit is not characteristic of at least one or more concurrent features, said step of acting includes discontinuing said communication.

23. A method in a blade server environment of a network interface card (NIC) determining to either continue or discontinue a communication link with a link partner in response to a first request to said NIC to discontinue said communication, said method comprising steps of:
  receiving a request to discontinue a communication link between said NIC and said link partner,
  reading a support data bit in non-volatile random access memory (NVRAM) of said NIC provided by a baseboard management controller in response to a command generated by a management module from information obtained by said management module of data characteristics of said link partner, wherein the support bit is updated by a baseboard management controller,
  and acting upon said communication link to either continue or discontinue in relation to said reading, wherein said acting step includes continuing said communication link where said reading of said support data was in relation to link partner data characteristics having one or more concurrent features more requiring a link disruption of less than 50 milliseconds.

24. The method of claim 23, wherein said acting step includes continuing said communication link where said reading of said support data was in relation to link partner data characteristics having one or more concurrent features more requiring a link disruption of less than 5 milliseconds.

25. A computing device having one or more blade servers, a network interface card (NIC), a link partners and logic means capable of enabling said NIC in determining to either continue or discontinue a communication link with a link partner in response to a first request to said NIC to discontinue said communication, said computing device being configured to carry out the steps of:
  receiving a request to discontinue a communication link between said NIC and said link partner,
  reading a support data bit in non-volatile random access memory (NVRAM) of said NIC provided by a baseboard management controller in response to a command generated by a management module from information obtained by said management module of data characteristics of said link partner, wherein the support bit is updated by a baseboard management controller,
  and acting upon said communication link to either continue or discontinue in relation to said reading, wherein said acting step includes continuing said communication link where said reading of said support data was in relation to link partner data characteristics having one or more concurrent features more requiring a link disruption of less than 50 milliseconds.

26. A computer program product stored on memory means having a plurality of program instructions for causing a computer to control an execution of an application for: comprising:
  computer readable program means for causing a computer to control an execution of an application; the computer program product including program instructions for:
  identifying a type of link partner said network interface means is in communication with,
  determining an integrity value for said link partner,
  updating, by a baseboard management controller, a link partner data bit in a memory means of said network interface means in relation to data characteristics of said link partner;
  and affecting said communications of said network interface means with said link partner in relation to said updated link partner data bit; wherein where said integrity value supports a concurrent feature so as to maintain said network interface means communication with said link partner if said link partner has one or more concurrent features or data characteristics, both of which require a link disruption of less than 50 milliseconds.

27. A computer program product stored on a memory comprising:
memory means having a plurality of program instructions for causing a computer to control an execution of an application for enabling a network interface card (NIC) to either continue or discontinue a communication link with a link partner in response to a first request to said NIC to discontinue said communication, said method comprising steps of:
receiving a request to discontinue a communication link between said NIC and said link partner,
reading a support data bit in non-volatile random access memory (NVRAM) of said NIC provided by a baseboard management controller in response to a command generated by a management module from information obtained by said management module of data characteristics of said link partner, wherein the support data bit is updated by a baseboard management controller,
and acting upon said communication link to either continue or discontinue in relation to said reading, wherein said acting step includes continuing said communication link where said reading of said support data was in relation to link partner data characteristics having one or more concurrent features more requiring a link disruption of less than 50 milliseconds.

28. An article of manufacture comprising: a memory having a plurality of machine accessible instructions, which if executed by a machine, cause the machine to perform operations comprising:
identifying a type of link partner of a network interface means in communication therewith,
determining an integrity value for said link partner,
updating, by a baseboard management controller, a link partner data bit in a memory means of said network interface means in relation to one of data characteristics or type of said link partner;
and affecting said communications of said network interface means with said link partner in relation to said updated link partner data bit; wherein where said integrity value supports a concurrent feature so as to maintain said network interface means communication with said link partner if said link partner has one or more concurrent features or data characteristics, both of which require a link disruption of less than 50 milliseconds.

* * * * *